United States Patent [19]

Madeleine

[11] Patent Number: 4,925,765

[45] Date of Patent: May 15, 1990

[54] NEGATIVE SOLID BLOCK TONER

[75] Inventor: Dennis G. Madeleine, Cherry Hill, N.J.

[73] Assignee: E. I. Du Pont de Nemours and Company, Wilmington, Del.

[21] Appl. No.: 288,913

[22] Filed: Dec. 23, 1988

[51] Int. Cl.$^5$ .......................... G03G 9/08; G03G 9/10
[52] U.S. Cl. ..................... 430/110; 430/904
[58] Field of Search .................. 430/110, 115, 904

[56] References Cited

U.S. PATENT DOCUMENTS

| | | | |
|---|---|---|---|
| 4,355,167 | 10/1982 | Ciccarelli | 546/255 |
| 4,371,601 | 2/1983 | Ciccarelli | 430/110 |
| 4,378,419 | 3/1983 | Ciccarelli | 430/110 |
| 4,414,372 | 11/1983 | Farnham et al. | 526/190 |
| 4,417,034 | 11/1983 | Webster | 526/190 |
| 4,442,189 | 4/1984 | Lu et al. | 430/45 |
| 4,480,021 | 10/1984 | Lu et al. | 430/106.6 |
| 4,508,880 | 4/1985 | Wester | 526/190 |
| 4,518,673 | 5/1985 | Noguchi et al. | 430/110 X |
| 4,524,196 | 6/1985 | Farnham et al. | 526/190 |
| 4,568,624 | 2/1986 | Ohishima et al. | 430/109 |
| 4,581,312 | 4/1986 | Nakahara et al. | 430/102 |
| 4,588,795 | 5/1986 | Dicker et al. | 526/192 |
| 4,621,039 | 11/1986 | Ciccarelli et al. | 430/106 |
| 4,656,226 | 4/1987 | Hutchins et al. | 525/93 |
| 4,755,563 | 7/1988 | West | 525/287 |

FOREIGN PATENT DOCUMENTS

| | | | |
|---|---|---|---|
| 60-69659 | 4/1985 | Japan | 430/137 |
| 61-99152 | 5/1986 | Japan | 430/109 |
| 1324745 | 4/1971 | United Kingdom . | |

Primary Examiner—Paul R. Michl
Assistant Examiner—Jeffrey A. Lindeman
Attorney, Agent, or Firm—Richard H. Burgess

[57] ABSTRACT

Negatively chargeable toner containing block copolymers for electrostatic reprography, giving improved compatibility with the toner resin and higher triboelectric charging. Preferred are block copolymers of styrene, methyl methacrylate and butyl methacrylate as one block and salts or esters of methacrylic acid or acrylic acid as the other block in the copolymer.

9 Claims, No Drawings

NEGATIVE SOLID BLOCK TONER

BACKGROUND

This invention concerns toners containing block copolymer charge directors. More specifically it concerns such charge directors which are useful in negatively charged solid toner.

Several patents exist in the field of toners.

In U.S. Pat. No. 4,442,189 Lu et al (1984) there are disclosed negatively charged dry developer compositions comprised of resin particles, pigment particles, and a polyanhydride charge director. Negatively charged toner compositions were also disclosed in U.S. Pat. No. 4,480,021 Lu et al (1984) where the charge directors are aryl sulfonamides and aryl alkyl sulfones.

In U.S. Pat. No. 4,355,167 Ciccarelli (1982) there are disclosed certain polymeric charge control agents for positively charged electrostatic toner compositions that are random copolymers of the formula [AxBy]z wherein A is a segment selected from vinyl monomers, B is a quaternary salt segment, x and y are numbers representing mole fractions of A and B, the sum of x and y being equal to 1, and Z represents the degree of polymerization. Free radical polymerization techniques are said to result in a telemetric quaternary salt having a number average molecular weight of from about 1,000 to about 10,000.

In U.S. Pat. Nos. 4,371,601 Ciccarelli (1982) and 4,378,419 Ciccarelli (1983) there are disclosed positively charged dry developer compositions containing such polymeric charge control agents.

In U.S. Pat. No. 4,621,039 Ciccarelli et al (1986) there are disclosed related toner compositions with fast admixing characteristics comprising certain polymeric charge control agents for electrostatic toner compositions that are homopolymers of amine-containing monomers, copolymers containing amine monomers, polymeric amines, polymeric quaternary ammonium compounds, telomeric amines and telomeric quaternary ammonium salt compositions, wherein the charge enhancing additives are associated with the pigment particles. An essential disclosure of U.S. Pat. No. 4,621,039 is that the charge agent is associated with the pigment particles. Association was affected by mixing the pigment particles and charge control agent prior to adding the resulting mixture to the polymer resin particles required for formation of the toner composition. This Patent further teaches that it is necessary to disperse the pigment particles within the polymeric resin, and without proper dispersion, charge sharing does not result.

In addition to the advantages of proper dispersion of the pigment particles within the toner resin taught by '039, in some instances, particularly where color pigments are used, proper dispersion of the pigment is also desirable in optimizing color quality in the xerographic image.

U.S. Pat. No. 4,656,226 Hutchins et al (1987) teaches the preparation of AB block copolymers suitable for use as pigment dispersants, by group transfer polymerization techniques (GTP) such as those disclosed in U.S. Pat. Nos. 4,417,034 (1983) and 4,508,880 (1985) both to Webster, and U.S. Pat. Nos. 4,414,372 (1983) and 4,524,196 (1985) both to Farnham et al, and U.S. Pat. No. 4,588,795 Dicker et al (1986). Quaternized block copolymers, preferably made by GTP, are disclosed in U.S. Pat. No. 4,755,563 (1988) West.

Pressure-fixable toners containing copolymer of styrene and dimethylaminoethylmethacrylate are taught in U.S. Pat. No. 4,581,312 Nakahara et al (1986).

Toners containing block copolymerized styrene and dyes are known from U.S. Pat. No. 4,568,624 Ohshima et al (1986).

The above patents are hereby incorporated herein by reference. They provide relevant background for the present invention, but none suggest ways or means of further improving triboelectric charge and compatibility of charge director with the toner resin.

There is a need for improved developer compositions which contain toner and carrier particles, wherein the toner particles charge negatively. Further, there is a need for developer compositions which can be used to render visible electrostatic latent images containing positive charges on the photoreceptor surface, and which compositions will transfer effectively electrostatically from such a photoreceptor surface to plain bond paper without causing blurring or adversely affecting the quality of the image. Moreover, there is a need to provide charge control agents which are even more compatible with the toner resin, the charge control agent having exceptional dispersibility while exhibiting higher uniform and stable net toner charge. Further, there is a need for charge control agents that facilitate the dispersion of the pigment within the toner resin so that charge exchange is promoted and color quality is optimized.

SUMMARY OF THE INVENTION

The present invention provides a negatively chargeable solid or dry toner composition comprising resin particles, pigment particles and charge enhancing additive, the additive being selected from the group consisting of block polymers of the type AB, BAB, ABA, wherein B is a segment that is compatible with the resin particles, the monomer units of said A segment, when homopolymerized, having a polarity which is greater than the polarity of the monomer units of said B segment when homopolymerized, (a) A is one or two blocks which comprise about from 0.1 to 50% by weight of the copolymer, having a number average molecular weight of about from 200 to 10,000 and prepared from at least one monomer selected from compounds of the general formula $CH_2=CCH_3CO_2R$ or $CH_2=CHCO_2R$, wherein R is hydrogen, in which case adjacent carboxylic groups can be dehydrated to form anhydride units, or R is an inorganic or organic cation or R is an alkyl group of 1–20 carbon atoms where at least 2 pendant moieties in the block at the terminal end of R are of the general formula $—SO_2R_1$ or $—SO_2NHR_1$, wherein $R_1$ is an aryl group or an alkyl group of 1–20 carbon atoms, and (b) B is one or two blocks which are the balance of said copolymer, having a number average molecular weight of about from 500 to 100,000 and prepared from monomers selected from styrene, substituted styrene, butadiene or compounds of the general formulas $CH_2=CCH_3CO_2R'$ and $CH_2=CHCO_2R'$, wherein R' is alkyl of 1–20 carbon atoms.

DETAILED DESCRIPTION

Surprisingly, it has been found that block copolymers of the invention permits greater compatibility with the binder polymers of toners, especially styrenic binders, than corresponding random copolymers suggested by the prior art.

Also, higher triboelectric charging can be obtained.

Preferably, the application of toners of the invention is in accordance with the teachings of U.S. Pat. No. 4,442,189, and the preparation of the charge directing block copolymers is in accordance with the teachings of U.S. Pat. Nos. 4,755,563 and 4,656,226.

Block copolymers can also be synthesized by cationic polymerization, but side reactions can dominate the product if low temperatures are not used.

Preferably, methacrylate and acrylate monomers can be copolymerized into block copolymers by group transfer polymerization as described in Webster, U.S. Pat. No. 4,508,880 at column 8, lines 4 to 58. Monomers which are preferred for the A block of the copolymer, containing the pendant ionic groups, include acrylic acid and methacrylic acid. For GTP processes, their precursors would be used. Monomers which are preferred for the B block of the copolymers include methyl methacrylate, butyl methacrylate and 2-ethylhexyl methacrylate.

Block copolymers can also be formed by free radical polymerization wherein the initiation unit is comprised of two different moieties which initiate polymerization at two distinctly different temperatures. However, this method suffers from contamination of the block copolymers with homopolymer and coupled products.

The block copolymers of the present invention can also be prepared by conventional anionic polymerization techniques, in which a first block of the copolymer is formed, and, upon completion of the first block, a second monomer stream is started to form a subsequent block of the polymer. The reaction temperatures using such techniques should be maintained at a low level, for example, 0° to −40° C., so that side reactions are minimized and the desired blocks, of the specified molecular weights, are obtained.

Monomers which are illustrative for the A block of the copolymer include methacrylic acid and acrylic acid, in which case the monomers may be dehydrated to form the corresponding anhydride. Also, the salts of the acids can be formed by reacting with organic or inorganic bases such as NaOH, KOH, CaH$_2$ or trialkylamine and the like. Esters of acrylic and methacrylic acid may also be used where the terminal group may be a sulfone or sulfonamide.

The amount of charge control agent added to the toner ranges from about 0.1% by weight to about 35% by weight and preferably from about 0.1% by weight to about 15% by weight. The amount of charge control agent employed can be outside these ranges providing that such amounts accomplish the objectives of the present invention. The charge control agent can be blended into the system or coated onto the pigment or colorant such as carbon black which is part of the developing composition.

Numerous methods may be employed to produce the toner of the present invention, one method involving melt blending the resin, the pigment and the charge control agent, followed by mechanical attrition. Other methods include those well known in the art such as spray drying and dispersion polymerization. For example, a solvent dispersion of a resin, pigment and charge control agent are spray dried under controlled conditions, thereby resulting in the desired product. Such a toner prepared in this manner results in a positively charged toner in relationship to the carrier materials used.

Incompatibility of the charge agent with toner resin can result in little or no charge agent in some of the toner particles. This is particularly true of the smaller toner particles in the particle size distribution. As a result, these smaller particles will not acquire the correct sign during the admixing process and begin to accumulate in the machine. Also, these "wrong sign" particles can add to the background during xerographic transfer process. Use of one of the polymeric charge control agents resulted in few of the "wrong sign" particles being generated. It appears that the block polymeric charge enhancing additives are more compatible with a styrene/butadiene resin than commercially available additives. This greater degree of compatibility results in better mixing and more of the toner particles having the correct sign.

In the following examples and comparisons, parts, percentages and proportions are by weight except where indicated otherwise.

EXAMPLE I

BLOCK COPOLYMER MMA/BMA//MAA SYNTHESIZED BY GROUP TRANSFER POLYMERIZATION

A reaction vessel is charged with 200 g tetrahydrofuran (THF), 2.3 g p-xylene, 6.7 g 1-methoxy-1-trimethylsiloxy-2-methylpropene ("initiator"), and 0.3 mL 1M tetrabutylammonium 3-chlorobenzoate in acetonitrile ("catalyst"). To prepare a B block, two feeds are begun simultaneously. The first feed contains a mixture of 100 g of methyl methacrylate and 100 g of butyl methacrylate, and is added over 40 minutes. The second feed contains 0.3 mL of 1M catalyst in 4.5 mL of THF and is added over 95 minutes. Fifteen minutes after the first feed is finished the A block is formed by adding 18.9 g of trimethylsilyl blocked methacrylic acid (TMS-MAA) over ten minutes. The reaction is terminated by adding 60 grams of methanol to the reaction mixture. The free acid polymer is formed by deblocking the reaction mixture by adding 15 g of methanol, 8 g of water and 0.5 g or dichloroacetic and refluxing the mixture for two hours. The acid polymer can be isolated by precipitation in hexane. The anhydride version of this polymer can be formed by dehydrating the acid groups by chemical or thermal means, followed by precipitation.

EXAMPLE II

TRIBOELECTRIC CHARGING OF TONERS FORMULATED WITH BLOCK COPOLYMERS OF EXAMPLE I

The acid and anhydride block copolymer solutions of Example I are precipitated in excess hexane (1 part solution to 10 parts hexane) and dried in a vacuum oven overnight. A toner composition is prepared of each of the charge control agents by melt blending followed by mechanical attrition, 2 parts of the precipitated block copolymer with 8 parts of Black Pearls L carbon black and 90 parts of a styrene/n-butylmethacylate resin, which is 58% by weight styrene and 42% by weight n-butylmethacrylate (Hercules Piccotoner 1292). Three parts of each toner and 97 parts of an uncoated ferrite carrier are blended into separate developer compositions. The developer compositions were roll milled and after twenty minutes of roll milling the triboelectric charge on the toner can be measured using a Vertex Model T-100 Triboelectric Tester. Tribotester measurements are made by loading the developer composition into a Faraday cage and using a stream of air to remove charged particles that are finer than the cage screen. The opposite net charge remaining on the developer composition is neutralized and measured. The block copolymers would be found to charge the toner negatively.

I claim:

1. A negatively chargeable solid toner composition comprising resin particles, pigment particles and charge enhancing additive, the additive being selected from the group consisting of block polymers of the type AB, BAB, ABA, wherein B is a segment that is compatible with the resin particles, the monomer units of said A segment, when homopolymerized, having a polarity which is higher than the polarity of the monomer units of said B segment when homopolymerized, (a) A is one or two blocks which comprise about from 0.1 to 50% by weight of the copolymer, having a number average molecular weight of about from 200 to 10,000 and prepared from at least one monomer selected from compounds of the general formula $CH_2=CCH_3CO_2R$ or $CH_2=CHCO_2R$, wherein R is hydrogen, in which case adjacent carboxylic groups can be dehydrated to form anhydride units, or R is an inorganic or organic cation or R is an alkyl group of 1-20 carbon atoms where at least 2 pendant moieties in the block at the terminal end of R are of the general formula $-SO_2R_1$ or $-SO_2NHR_1$, wherein $R_1$ is an aryl group or an alkyl group of 1-20 carbon atoms, and (b) B is one or two blocks which are the balance of said copolymer, having a number average molecular weight of about from 500 to 100,000 and prepared from monomers selected from styrene, substituted styrene, butadiene or compounds of the general formulas $CH_2=CCH_3CO_2R'$ and $CH_2=CHCO_2R'$, wherein R' is alkyl of 1-20 carbon atoms.

2. The toner of claim 1 wherein the A block is derived from monomers selected from the group consisting of
   acrylic acid,
   methacrylic acid,
   anhydrides of 2 of the above monomers formed by a dehydration reaction, and
   salts and esters of acrylic and methacrylic acid.

3. A toner composition in accordance with claim 1, wherein the pigment particles are carbon black.

4. A toner composition in accordance with claim 1, wherein the resin particles are selected from the group consisting of styrene acrylate copolymers, styrene methacrylate copolymers, styrene butadiene copolymers, acrylate and methacrylate copolymers and polyesters.

5. A developer composition comprised of the toner composition of claim 1, and carrier particles.

6. A developer composition in accordance with claim 5, wherein the carrier particles consist of a steel core coated with a polymeric composition.

7. A developer composition in accordance with claim 5, wherein the pigment particles are carbon black.

8. A developer composition in accordance with claim 5, wherein the pigment particles are cyan, magenta, yellow, red, blue, green or mixtures thereof.

9. A developer composition in accordance with claim 5, wherein the resin particles are selected from the group consisting of styrene acrylate copolymers, styrene methacrylate copolymers, styrene butadiene copolymers, and polyesters.

* * * * *